United States Patent [19]

Grunsky et al.

[11] Patent Number: 4,493,596
[45] Date of Patent: Jan. 15, 1985

[54] ROTARY MATERIAL REMOVING TOOL

[75] Inventors: Manfred Grunsky, Dreieichenhain; Reiner Sussmuth, Neu Isenburg; Dieter Dehn, Frankfurt am Main; Günter Ischen, Oberhausen, all of Fed. Rep. of Germany

[73] Assignee: Stellram S.A., Nyon, Switzerland

[21] Appl. No.: 450,678

[22] Filed: Dec. 17, 1982

[30] Foreign Application Priority Data

Feb. 8, 1982 [DE] Fed. Rep. of Germany ....... 3204210

[51] Int. Cl.³ ............................................. B23B 51/00
[52] U.S. Cl. ................................. 408/233; 408/231; 408/713
[58] Field of Search ............... 408/232, 233, 181, 231, 408/239, 713, 227

[56] References Cited

U.S. PATENT DOCUMENTS

| | | | |
|---|---|---|---|
| 1,017,352 | 2/1912 | Wagner | 408/233 X |
| 2,237,901 | 4/1941 | Chun | 408/223 |
| 2,400,856 | 5/1946 | Thompson | 408/233 |
| 2,621,548 | 12/1952 | Williams | 408/233 |
| 3,144,792 | 8/1964 | Marcuis | 408/181 |
| 3,667,768 | 6/1972 | Stoicey | 408/239 R X |
| 3,776,656 | 12/1973 | Benjamin | 408/233 |
| 4,060,335 | 11/1977 | Holloway et al. | 408/233 |

FOREIGN PATENT DOCUMENTS

| | | | |
|---|---|---|---|
| 7528316 | 8/1977 | Fed. Rep. of Germany | 408/233 |
| 3001120 | 7/1981 | Fed. Rep. of Germany | 408/233 |
| 918475 | 2/1947 | France | 408/181 |
| 2092034 | 8/1982 | United Kingdom | 408/199 |

*Primary Examiner*—William R. Briggs
*Attorney, Agent, or Firm*—Peter K. Kontler

[57] ABSTRACT

A rotary material removing tool whose holder can be installed in and rotated by a milling or like machine. The front portion of the holder has a transverse slot flanked by two prongs and receiving a portion of a flat cutter which is held in the slot by one or more coupling screws in such a way that its rear surface is urged against the bottom surface in the slot. The coupling screw is received in a bore of one of the prongs and its head extends into a bore of the cutter. The peripheral surface of the head and/or the surface surrounding the corresponding portion of the bore in the cutter is conical, and the two surfaces cooperate to urge the rear surface of the cutter against the bottom surface in the slot when the screw is driven home. To this end, the axis of the bore which receives the shank of the screw is disposed between the axis of the bore in the cutter and the bottom surface in the slot.

17 Claims, 15 Drawing Figures

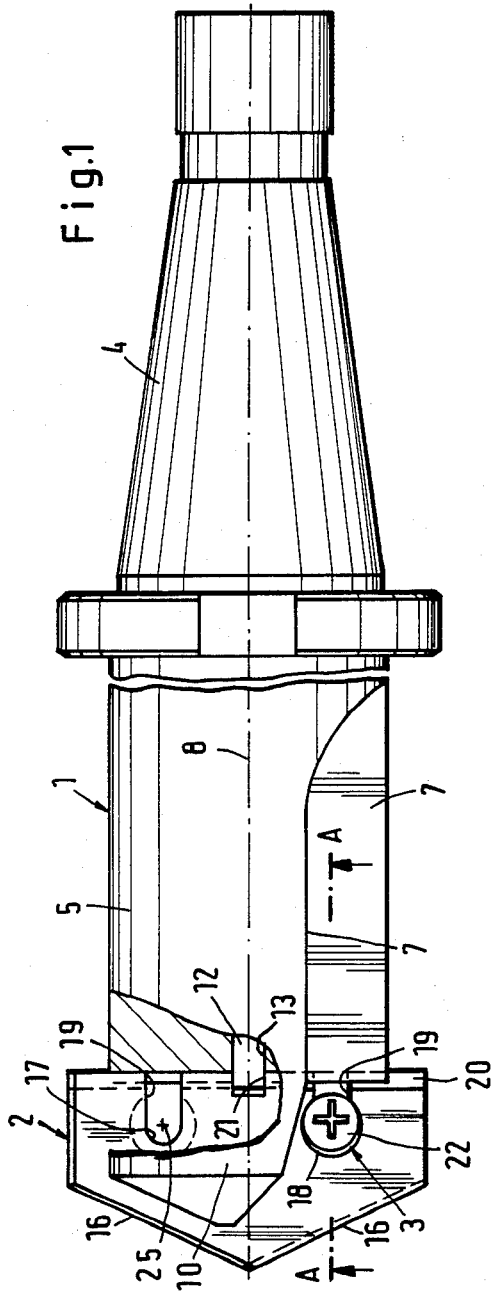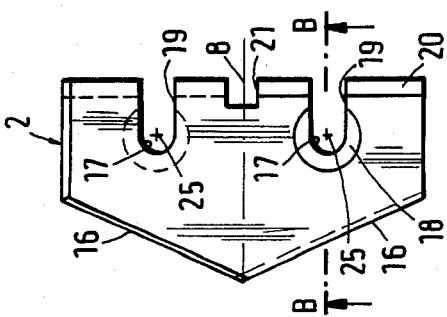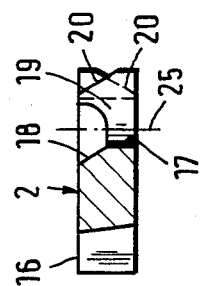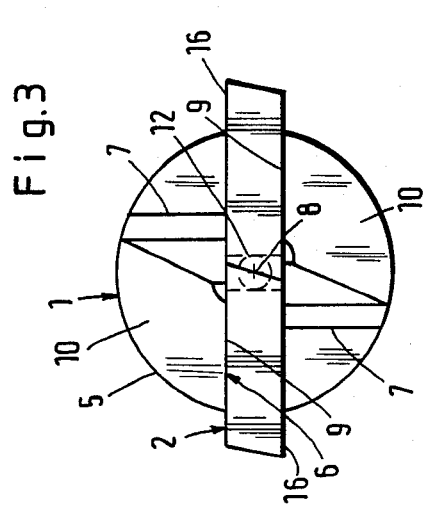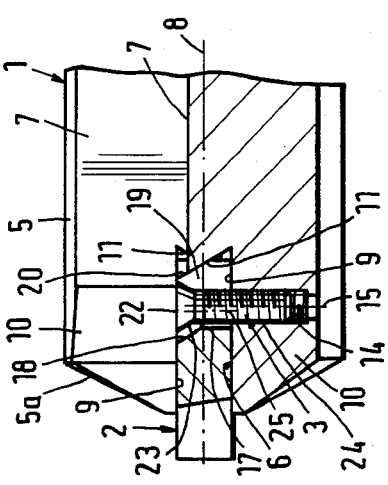

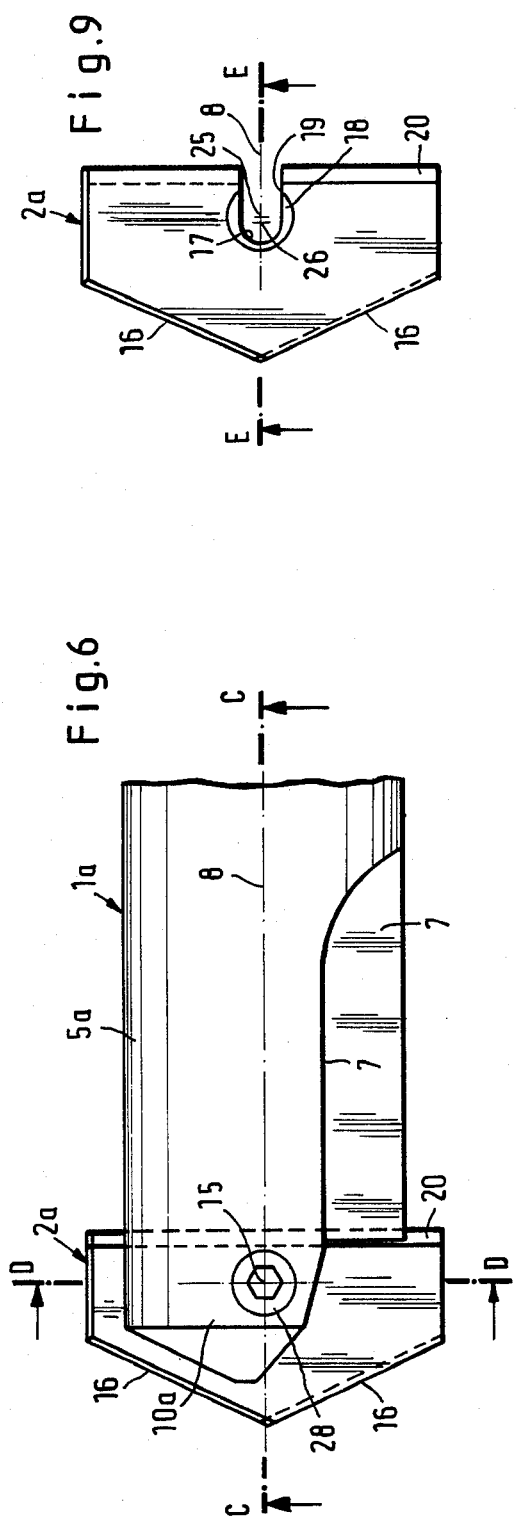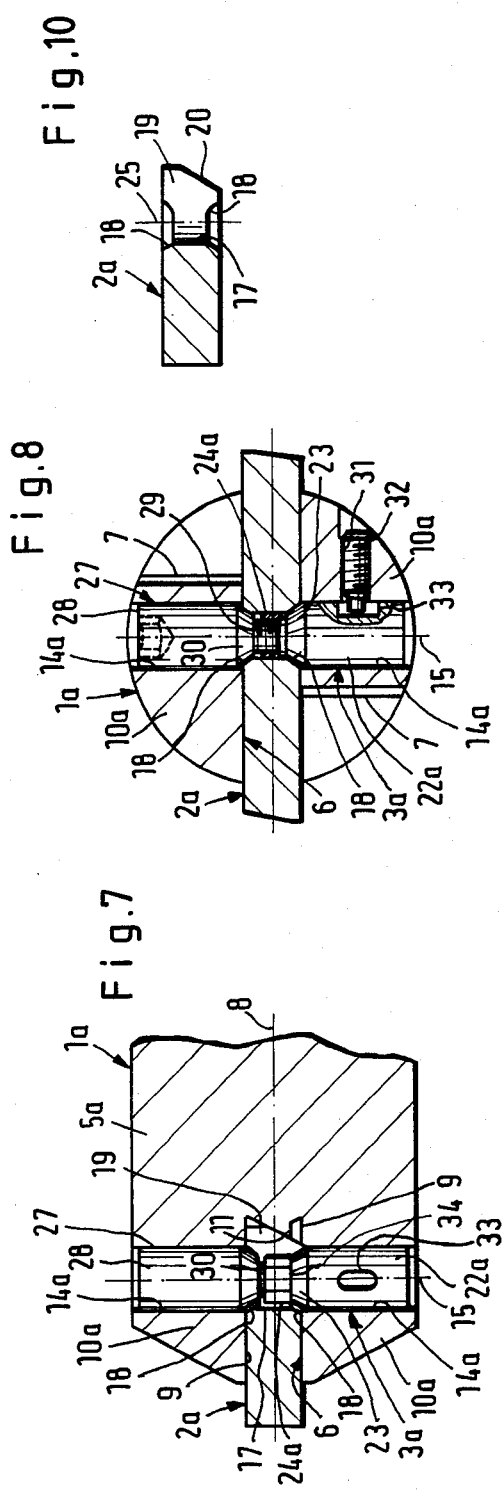

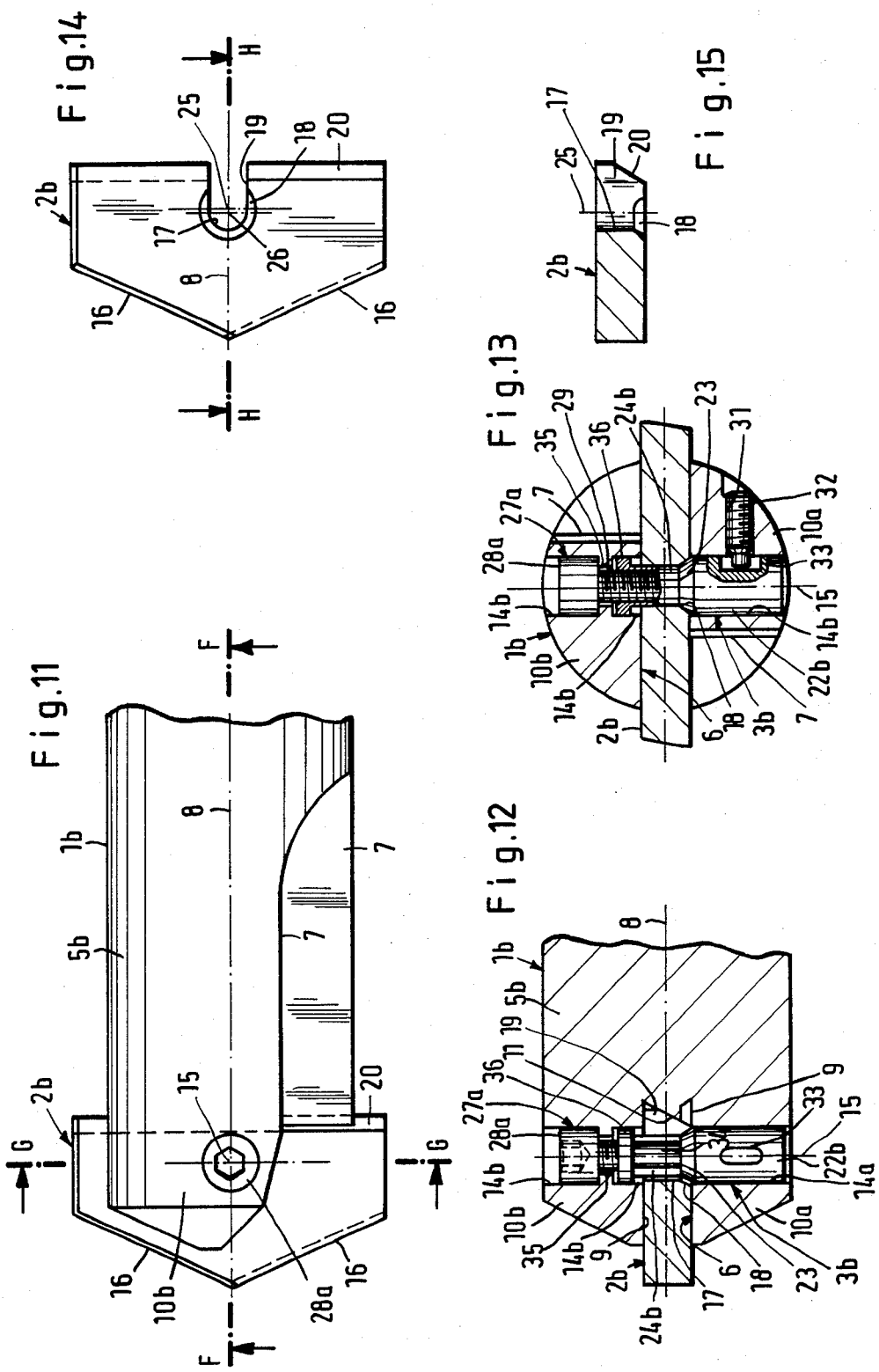

ROTARY MATERIAL REMOVING TOOL

CROSS-REFERENCE TO RELATED CASES

The tool of the present invention constitutes an improvement over and a further development of the tools which are disclosed in commonly owned copending patent application Ser. Nos. 398,633 (filed July 15, 1982 by Dieter Dehn), 398,639 (filed July 15, 1982 by Manfred Grunsky et al.) and 398,796 (filed July 16, 1982 by Dieter Dehn).

BACKGROUND OF THE INVENTION

The present invention relates to material removing tools in general, and more particularly to improvements in milling cutters, drills and/or analogous rotary material removing tools wherein the cutter or bit is detachably secured to a rotary holder and the holder is insertable into or otherwise connectable with the torque-transmitting element of a drilling, boring, milling or like machine.

It is already known to install the cutter or bit (hereinafter called cutter) of a rotary material removing tool in the slot which is provided in the front end face of a rotary holder whose rear portion is inserted into a drilling, boring, milling or like machine to rotate the cutter while the cutting edge or edges of the cutter remove material from a workpiece. As a rule, the cutter is secured to the holder by one or more screws or analogous threaded fasteners whose shanks extend into tapped bores of the holder and whose heads extend into holes or bores which are provided therefor in the cutter. The tapped bore or bores are machined into one or both extensions or prongs which form part of the holder and flank the slot for the cutter. At least that portion of the holder which is immediately adjacent to the slot is normally a cylinder whose peripheral surface is provided with one or more axially parallel grooves for evacuation of shavings, chips and/or otherwise configurated particles which are removed from the workpiece by the cutting edge or edges of the cutter. In many instances, the two grooves are disposed diametrically opposite each other (with reference to the axis of the holder) and each thereof has a substantially L-shaped crosssectional outline. One of the surfaces flanking each of the grooves is normally parallel to the internal surfaces of the prongs, i.e., to the surfaces which are immediately adjacent to the slot for the cutter.

In accordance with a prior proposal, each of the two prongs has a discrete tapped bore for the shank of a discrete screw whose head extends into a bore of the cutter. In other words, the cutter has two bores, one for each of the screw heads. The rear surface of the cutter extends at right angles to the axis of the holder and is parallel to the bottom surface of the holder in the deepmost portion of the slot. A pin which extends at right angles to the plane of the internal surface of one of the prongs is provided to enter a recess in the cutter and to thus center the cutter relative to the holder. In order to enable the pin to enter the recess, the corresponding prong must be bent sideways so as to allow for the placing of the pin into register with the recess. In view of such design of the holder, the screws are received in the corresponding bores of the cutter with at least some play which prevents the rear surface of the cutter from lying flush against the bottom surface of the holder. Consequently, the cutter is likely to vibrate relative to the holder when the latter is rotated in order to cause the cutting edge or cutting edges of the cutter to remove material from a workpiece.

OBJECTS AND SUMMARY OF THE INVENTION

An object of the present invention is to provide a novel and improved rotary material removing tool wherein vibrations and/or other stray movements of the cutter with reference to its holder are prevented in a simple and inexpensive way.

Another object of the invention is to provide a tool of the just outlined character wherein the cutter can be safely retained against vibratory and/or other stray movements with reference to the holder for any desired intervals of time and by resort to relatively simple, compact and inexpensive coupling means.

A further object of the invention is to provide a method of preventing vibrations and/or other stray movements of the cutter with reference to the holder of a rotary material removing tool, such as a milling cutter or the like.

An additional object of the invention is to provide a novel and improved holder for use in a cutter of the above outlined character.

A further object of the invention is to provide a novel and improved cutter for use in the above outlined material removing tool.

Another object of the invention is to provide novel and improved means for coupling the cutter to its holder.

The invention is embodied in a material removing tool, such as a milling cutter. The improved tool comprises a preferably cylindrical rotary holder whose front portion is formed with a slot which is disposed at least substantially centrally of the holder and is flanked by a pair of prongs. The front portion of the holder has a bottom surface in the deepmost portion of the slot, and at least one of the prongs is formed with a first bore which communicates with the slot and whose axis is preferably normal to the axis of the holder. The tool further comprises a cutter a portion of which is disposed in the slot and which has a rear surface adjacent to the bottom surface of the front portion of the holder. The cutter has a second bore whose axis is parallel to the axis of the first bore. The axis of the first bore is disposed between the axis of the second bore and the bottom surface in the slot, and the cutter has a first annular surface which surrounds a portion of the second bore. Still further, the tool comprises a screw, bolt or analogous means for coupling the cutter to the holder, and such coupling means comprises a shank extending into one of the two bores as well as a head extending into the other bore and having a second annular surface. At least a portion of at least one of these annular surfaces is at least substantially conical and bears against the other annular surface to thereby urge the rear surface of the cutter against the bottom surface of the holder. The external surface of the front portion of the holder has at least one axially parallel groove for evacuation of chips, shavings or like fragments from the region of the cutter. Each of the prongs can be provided with one chip evacuating groove, and such grooves can be disposed substantially diametrically opposite each other with reference to the axis of the holder.

If the first bore is a tapped bore, the shank is externally threaded and extends into such tapped bore to releasably secure the cutter to the one prong and to simultaneously cooperate with the head in urging the rear surface of the cutter against the bottom surface in the slot.

The prongs have preferably parallel internal surfaces which flank the slot in the front portion of the holder, and the bottom surface can include two mutually inclined sections having portions disposed at the opposite sides of the axis of the holder and each adjacent to a different prong. Such sections of the bottom surface preferably make acute angles with the internal surfaces of the respective prongs, and the configuration of the rear surface on the cutter is preferably complementary to the configuration of the just discussed bottom surface to thus ensure that the cutter is wedged into the front portion of the holder and is not likely to vibrate and/or perform other stray movements relative to the holder when the coupling means is properly applied to ensure that the conical annular surface bears against the other annular surface.

The other prong can be provided with a first additional bore, and the cutter can be provided with a second additional bore whose position with reference to the first additional bore is the same as the position of the first mentioned bore in the cutter relative to the bore in the one prong. Such tool then further comprises a second coupling means which includes a shank extending into one of the additional bores and a head extending into the other additional bore. At least one of the shanks is preferably formed with external threads, and the bore receiving such shank is a tapped bore.

In accordance with a modification, the coupling means can be formed with an axially extending tapped third bore, and the other prong is then formed with a fourth bore in register with the third bore. Such tool further comprises a screw, bolt or an analogous clamping member having a first portion (e.g., the head of a screw) in the fourth bore and an externally threaded second portion (e.g., the shank of a screw) extending into the third bore. The head of the coupling means can be recessed into the bore of the one prong, and such tool can be further provided with means for preventing rotation of the head in the bore of the one prong. To this end, the external surface of the head of the coupling means can be formed with an axially parallel groove, and the rotation preventing means then comprises a projection which is supported by the one prong and extends into the groove. For example, the projection can constitute the tip of the shank of a screw which meshes with the one prong.

If the tool comprises a clamping member, the other prong can be provided with a projection which extends into the fourth bore adjacent to the second portion of the clamping member inwardly of the first portion, as considered in the radial direction of the holder. The first portion of the clamping member can constitute the enlarged head of a screw, and the just mentioned projection can constitute an annular collar which surrounds the shank of such screw. The external surface of the head of the clamping member can constitute a further annular surface which cooperates with the annular surface in the bore of the cutter to urge the latter toward the bottom surface of the holder when the clamping member is driven home.

The cutter can be provided with a passage which communicates with the bore of the cutter and extends all the way to the rear surface of the cutter to allow for extraction of the cutter from the slot while the coupling means extends into the slot. In such tools, the one annular surface is preferably the annular surface surrounding the bore of the cutter. The shank of the coupling means can have two flat parallel surfaces whose mutual spacing preferably equals or approximates the width of the passage.

The novel features which are considered as characteristic of the invention are set forth in particular in the appended claims. The improved tool itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary side elevational view of a rotary material removing tool which embodies one form of the invention, a portion of the holder being shown in a sectional view;

FIG. 2 is a fragmentary sectional view as seen in the direction of arrows from the line A—A of FIG. 1;

FIG. 3 is a front elevational view of the tool as seen from the left-hand side of FIG. 1;

FIG. 4 is a side elevational view of the cutter;

FIG. 5 is a sectional view of the cutter as seen in the direction of arrows from the line B—B of FIG. 4;

FIG. 6 is a fragmentary side elevational view of a second material removing tool;

FIG. 7 is a fragmentary axial sectional view as seen in the direction of arrows from the line C—C of FIG. 6;

FIG. 8 is a transverse sectional view as seen in the direction of arrows from the line D—D of FIG. 6;

FIG. 9 is a side elevational view of the cutter in the tool of FIG. 6;

FIG. 10 is a sectional view as seen in the direction of arrows from the line E—E of FIG. 9;

FIG. 11 is a fragmentary side elevational view of a third material removing tool;

FIG. 12 is a fragmentary axial sectional view as seen in the direction of arrows from the line F—F of FIG. 11;

FIG. 13 is a transverse sectional view as seen in the direction of arrows from the line G—G of FIG. 11;

FIG. 14 is a side elevational view of the cutter in the tool of FIG. 11; and

FIG. 15 is a sectional view as seen in the direction of arrows from the line H—H of FIG. 14.

DESCRIPTION OF THE PREFERRED EMBODIMENTS

The material removing tool of FIGS. 1 to 5 comprises an elongated rotary holder 1, a cutter 2, and two coupling devices in the form of screws 3 only one of which can be actually seen in the drawing. The holder 1 comprises a conical rear portion 4 which can be inserted into and non-rotatably secured in a rotary component of a boring, drilling, milling or like machine, not shown, and a substantially cylindrical front portion 5 having a front face 5a provided with an axially extending slot 6 flanked by two forwardly extending legs or prongs 10. The external surface of the front portion 5 is formed with two chip evacuating grooves 7 which are disposed diametrically opposite each other (with reference to the axis 8 of the holder 1) and each of which is machined into one of the prongs 10. The prongs 10 have internal surfaces 9 which are immediately adjacent to the slot 6, and the bottom surface of the front portion 5 (namely, the surface in the deepmost portion of the slot 6) includes two sections 11 extending transversely of the front portion 5 and being inclined with reference to each other. As can be readily seen in FIG. 2, each of the two sections 11 of the bottom surface in the slot 6 makes an acute angle with the adjacent internal surface 9. The outer portions of sections 11 of the bottom surface are disposed at the opposite sides of the axis 8 of the holder 1. The bottom surface of the front portion 5 in the slot 6 is further formed with a centrally located blind bore 13 for a centering pin 12 which extends into the slot 6 and into a complementary centering recess 21 (see FIGS. 1 and 4) in the rear surface of the cutter 2 when the latter is properly installed in the slot 6. The axis of the centering pin 12 coincides with the axis 8 of the holder 1.

Each of the prongs 10 has a tapped bore 14 whose axis 15 is normal to the plane of the respective internal surface 9 and is laterally offset with reference to the axis 8 of the holder. The inner ends of the bores 14 are disposed in the regions of front portions of the respective grooves 7 (see FIG. 2).

The cutter 2 has a centrally located tip which is disposed between two mutually inclined cutting edges 16 making an obtuse angle (see FIG. 1 or 4). The body of the cutter 2 is formed with two parallel bores 17 which are disposed at the opposite sides of the axis 8 when the cutter is properly installed in the slot 6 of the front portion 5 of the holder 1, and the annular surfaces surrounding the bores 17 of the cutter 2 include conical portions 18. Such conical portions are adjacent to the opposite major sides or surfaces of the cutter 2 (note FIG. 4). Each of the bores 17 communicates with a passage 19 (see particularly FIGS. 4 and 5) which extends all the way to the rear surface of the cutter 2 and allows for insertion of the cutter into or for its extraction from the slot 6 after partial loosening of the coupling screws 3, i.e., while portions of such screws extend into the slot 6. The width of each passage 19 corresponds to the diameter of the respective bore 17. The rear surface of the cutter 2 has two mutually inclined sections 20 each of which is complementary to one of the aforementioned sections 11 forming part of the bottom surface of the front portion 5 in the slot 6. The longitudinal directions of the sections 20 are normal to the axis 8 and portions of these sections are disposed at the opposite sides of such axis when the cutter 2 is properly received in the slot 6. The inclination of the sections 20 can match, or it can merely approximate, the inclination of the sections 11 of the bottom surface in the slot 6. For example, the angle between a section 20 and one of the internal surfaces 9 can slightly exceed the angle between such internal surface and the respective section 11. This enhances the wedging effect which is produced when the cutter 2 is properly installed in and properly coupled to the front portion 5 of the holder 1.

As mentioned above, the recess 21 in the rear surface of the cutter 2 serves to receive a portion of the centering pin 12.

Each of the coupling screws 3 has a head 22 with a cruciform recess (note FIG. 1) for the working end of a suitable Phillips (trademark) screwdriver. The annular surface 23 of each head 22 is a conical surface whose taper matches that of the corresponding annular surface 18. The externally threaded shanks 24 of the coupling screws 3 are received in the respective tapped bores 14. The axes of the bores 17 are shown at 25; as seen in FIG. 2, the axis 15 of each tapped bore 14 is located between the respective axis 25 and the bottom surface of the front portion 5 in the slot 6. In other words, the axes of the shanks 24 in the tapped bores 14 do not coincide with the axes 25 of the bores 17 in the cutter 2 so that, when the coupling screws 3 are tightened, the annular external surfaces 23 of the heads 22 bear against the respective annular surfaces 18 and urge the sections 20 of the rear surface of the cutter 2 against the respective sections 11 of the bottom surface in the slot 6. Thus, the heads 22 can urge the cutter 2 in the direction of the axis 8 deeper into the slot 6 so as to thereby greatly reduce the likelihood of vibration of the cutter 2 relative to the front portion 5 when the holder 1 is rotated in a boring, milling or like machine. The sections 11 and 20 engage with each other not only along the full width of the respective prongs 10 but also outside of such prongs (namely, in the regions of the respective evacuating grooves 7; this also contributes to reliable retention of the cutter 2 in the front portion 5 of the holder 1 in such a way that the cutter is incapable of vibrating. Still further, the feature that the coupling screws 3 are disposed at the opposite sides of the axis 8 also reduces the likelihood of vibration of the cutter 2 with reference to the holder 1 when the improved tool is in actual use.

The taper of the annular surfaces 18 and of the corresponding annular surfaces 23 need not be identical; in fact, it is possible to replace the surfaces 18 or 23 with cylindrical surfaces as long as one of the cooperating surfaces is configured with a view to ensure that the cutter 2 is urged against the sections 11 of the bottom surface in the slot 6 when the coupling screws 3 are driven home with a requisite force. The properly applied screws 3 not only urge the sections 20 against the respective sections 11 but they also ensure that the internal surfaces 9 of the prongs 10 bear against the respective sides of the cutter 2. This prevents any wobbling of the cutter in the direction of the axis 8 as well as in directions at right angles to such axis.

The feature that the sections 20 of the rear surface of the cutter 2 engage the corresponding sections 11 of the bottom surface in the slot 6 of the front portion 5 of the holder 1 ensures that the engagement between the cutter 2 and the front portion 5 is continuous across the entire diameter of the front portion 5 in spite of the provision of evacuating grooves 7 in the prongs 10, i.e., in spite of the fact that the width of each of the prongs 10 is reduced in the region of the slot 6.

While it is possible to employ a single coupling screw 3, the provision of at least one coupling screw for each of the prongs 10 is desirable and advantageous in many instances because this further reduces the likelihood of any stray movements of the cutter 2 relative to the holder 1. As mentioned above, each of the heads 22 urges the cutter 2 against the sections 11 of the bottom surface in the slot 6, and each of the heads 22 further urges the internal surface 9 of the respective prong 10 against the corresponding side of the cutter.

Referring to FIGS. 6 to 10, there is shown a modified rotary material removing tool wherein all such parts which are identical with or clearly analogous to corresponding parts of the first tool are denoted by similar reference characters. The modified holder 1a of the second tool has a front portion 5a with two prongs 10a which flank the slot 6. Each of the prongs 10a has a bore 14a bounded by a smooth internal surface (i.e., a surface without threads). The two bores 14a have a common axis which intersects the axis 8 of the holder 1a and makes therewith an angle of 90 degrees. The configuration of the rear surface (sections 20) of the cutter 2a is the same as that of the rear surface of the cutter 2, and the configuration and mutual inclination of sections 11 of the bottom surface in the slot 6 of the front portion 5a is also the same as shown in FIGS. 1 and 2.

The cutter 2a has a single bore 17 whose axis 26 is also normal to and intersects the axis 8 of the holder 1a. The axis 26 of the bore 17 is normal to the planes of the major sides or surfaces of the cutter 2a. The surface surrounding the bore 17 has a centrally located cylindrical portion and two outwardly diverging (conical) annular outer portions 18. The common axis 25 of the annular portions 18 is nearer to the sections 20 of the rear surface of the cutter 2a than the axis 26 of the central portion of the bore 17 (note FIG. 4).

The coupling means for the cutter 2a of FIGS. 6 to 10 comprises a single screw 3a whose shank 24a has an axially extending tapped blind bore and which further comprises a larger-diameter head 22a having a conical annular surface 23. The head 22a is received in the bore 14a of one of the prongs 10a, and the bore 14a of the other prong 10a accommodates the larger-diameter cylindrical head 28 of a clamping screw 27 whose externally threaded shank 29 extends into the tapped bore of the shank 24a. The head 28 has a conical annular surface 30 and its exposed end face has a hexagonal recess for reception of the working end of a suitable tool which is used to rotate the clamping screw 27 with reference to the coupling screw 3a. The conicity of the annular surface 30 may be the same as that of the corresponding annular surface 18 in the bore 17 of the cutter 2a.

The material removing tool of FIGS. 6 to 10 further comprises means for preventing rotation of the head 22a in the respective bore 14a. Such rotation preventing means includes a screw 32 extending into a tapped bore 31 of one of the prongs 10a and having a projection or tip extending into an axially parallel recess or groove 33 machined into the peripheral surface of the cylindrical portion of the head 22a. The shank 24a of the screw 3a is largely cylindrical; it is provided with two parallel surfaces or flats 34 (one shown in FIG. 7) whose mutual spacing preferably matches or closely approximates the width of the passage 19 provided in the cutter 2a and extending from the bore 17 to the rear surface of the cutter. The surfaces 34 are parallel to the axis 8 of the holder 1a. The provision of surfaces 34 on the shank 24a further reduces the likelihood of angular displacement of the cutter 2a relative to the holder 1a. In addition, the surfaces 34 center the cutter 2a in the slot 6 of the front portion 5a. Therefore, the centering pin 12 of the first material removing tool can be dispensed with.

The common axis 25 of the conical annular surfaces 18 in the bore 17 of the cutter 2a is more distant from the bottom surface in the slot 6 than the common axis 15 of the bores 14a in the prongs 10a. Thus, when the heads 22a and 28 engage the respective tapering annular surfaces 18 of the cutter 2a, the latter is urged toward the sections 11 of the bottom surface in the slot 6 for the reasons explained in connection with FIGS. 1 to 5. At the same time, the screws 3a and 27 cooperate to urge the internal surfaces 9 of the prongs 10a against the respective sides of the cutter 2a.

An advantage of the tool which is shown in FIGS. 6 to 10 is that the cutter 2a must be provided with a single bore 17. Another advantage of the tool of FIGS. 6 to 10 is that the bores 14a in the two prongs 10a of the front end portion 5a of the modified holder 1a have a common axis which simplifies the manufacturing operation.

The provision of rotation preventing means (screw 32) exhibits the advantage that the head 22a of the coupling screw 3a is invariably held against rotation in the respective bore 14a while an operator uses a suitable tool to rotate the clamping screw 27 into firmer engagement with, or for the purpose of disengaging the screw 27 from, the screw 3a. Still further, the screw 32 reduces the likelihood of accidental loosening of the connection between the screws 3a and 27 because the screw 3a is always held against rotation with reference to the holder 1a.

The annular surfaces 18 or the annular surfaces 23, 30 need not be conical, as long as at least one of the cooperating annular surfaces tapers in a direction which ensures that the cutter 2a is urged toward the sections 11 of the bottom surface in the slot 6 when the clamping screw 27 is rotated in a direction to move its shank 29 deeper into the tapped axial bore of the shank 24a. The provision of coaxial screws 3a and 27 contributes to uniform distribution of forces which urge the cutter 2a deeper into the slot 6 of the front portion 5a. The cutter 2a can be withdrawn from the slot 6 as soon as the clamping screw 27 is rotated in a direction to move its head out of the corresponding bore 14a so that the surfaces bounding the single passage 19 of the cutter can slide past the shank 24a of the coupling screw 3a. This reduces the intervals of time which are required to remove or reinsert the cutter 2a into the front portion 5a of the holder 1a.

FIGS. 11 to 15 illustrate a third material removing tool which constitutes a modification of the tool shown in FIGS. 6 to 10. The prong 10b of the front portion 5b of the holder 1b has a protuberance in the form of an annular collar 35 extending into the corresponding bore 14b so as to surround the shank 29 of the clamping screw 27a inwardly of the corresponding head 28a, as considered in the radial direction of the holder 1b. The head 28a is a short cylinder which need not have a conical annular surface. The shank 24b of the coupling screw 3b has an annular flange 36 which is received in the bore 14b of the prong 10b. The bore 17 of the cutter 2b is surrounded in part by a conical annular surface 18 which cooperates with a complementary conical annular surface 23 at the inner end of the head 22b of the coupling screw 3b.

The conical annular surfaces 18 and 23 cooperate to urge the cutter 2b against the bottom surface in the slot 6 of the front portion 5b of the holder 1b. At the same time, the screws 3b and 27a cooperate to urge the internal surfaces 9 of the prongs 10a and 10b against the respective sides of the cutter 2b. Still further, the screws 3a and 27a cooperate to automatically center the cutter 2b relative to the holder 1a. The bias of the surfaces 9 upon the respective sides of the cutter 2b is even more pronounced than in the embodiment of FIGS. 6 to 10. This is due to the fact that, when the screw 28a is rotated in a direction to move the shank 29 deeper into the axial bore of the shank 24b, the inner end face of the head 28a bears against the collar 35 and urges the prong 10b with a substantial force in a direction toward the respective side of the cutter 2b. Actually, the screw 27a then urges the cutter 2b upwardly, as viewed in FIGS. 12 or 13, and against the internal surface 9 of the prong 10b.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A material removing tool, such as a milling cutter, comprising a rotary holder having a front portion provided with a transverse slot and including a pair of prongs having internal surfaces flanking said slot, said slot being disposed at least substantially centrally of said holder, said front portion having a bottom surface in said slot and said bottom surface including two mutually inclined sections having portions disposed at the opposite sides of the axis of said holder, each of said sections being adjacent to a different one of said internal surfaces and such sections making acute angles with the respective internal surfaces, at least one said prongs having a first bore communicating with said slot and having a first axis; a cutter disposed in said slot and having a rear surface adjacent said bottom surface and a second bore with a second axis parallel to said first axis, said rear surface having two mutually inclined sections each abutting against a different section of said bottom surface, said first axis being disposed between said second axis and said bottom surface and said cutter having a first annular surface surrounding said second bore; and means for coupling said cutter to said holder, including a shank extending into said first bore and a head having a larger diameter than said shank and extending into said second bore and having a second annular surface, at least a portion of at least one of said annular surfaces being at least substantially conical and bearing against the other of said annular surfaces to thereby urge said rear surface against said bottom surface, said cutter further having a passage communicating with said second bore and extending to said rear surface to allow for extraction of said cutter from said slot while said coupling means extends into said slot.

2. The tool of claim 1, wherein said front portion is at least substantially cylindrical.

3. The tool of claim 1, wherein said front portion of the holder has an external surface provided with an at least one material evacuating groove provided in one of said prongs.

4. The tool of claim 1, wherein said first bore is a tapped bore and said shank is externally threaded and its threads mesh with the threads in said tapped bore.

5. The tool of claim 1, wherein said first and second axes are at least substantially normal to the axis of said holder.

6. The tool of claim 1, wherein said passage has a predetermined width and said shank has a pair of parallel surfaces whose mutual spacing at least approximates said predetermined width.

7. The tool of claim 1, wherein the other of said prongs has an additional first bore and said cutter has an additional second bore, and further comprising additional coupling means including a shank extending into said additional first bore and a head extending into said additional second bore.

8. The tool of claim 7, wherein at least one of said shanks has external threads and the bore receiving said one shank is a tapped bore.

9. The tool of claim 1, wherein said coupling means has an axially extending tapped third bore and the other of said prongs has a fourth bore in register with said third bore, and further comprising a clamping member having a first portion in said fourth bore and an externally threaded second portion extending into said third bore.

10. The tool of claim 9, wherein the first portion of said clamping member constitutes the head and the second portion of said clamping member constitutes the shank of a screw.

11. The tool of claim 9, wherein the head of said coupling means is recessed into said first bore and further comprising means for preventing rotation of said head in said first bore.

12. The tool of claim 11, wherein said head has an external surface provided with an axially parallel groove and said rotation preventing means comprises a projection supported by said one prong and extending into said groove.

13. The tool of claim 12, wherein said rotation preventing means is a screw having a shank which constitutes said projection.

14. The tool of claim 9, wherein said one annular surface is said second annular surface and said first portion of said clamping member includes a head having a third annular surface, at least one of said second and third annular surfaces being at least slightly conical and bearing against the other of such surfaces.

15. The tool of claim 9, wherein said other prong has a projection extending into said fourth bore adjacent to said second portion and located inwardly of said first portion of said clamping member, as considered radially of said holder.

16. The tool of claim 15, wherein the diameter of the first portion exceeds the diameter of the second portion of said clamping member and said projection includes a collar surrounding said second portion.

17. A material removing tool, such as a milling cutter, comprising a rotary holder having a front portion provided with a transverse slot and including a pair of prongs flanking said slot, said front portion having a bottom surface in said slot and at least one of said prongs having a first bore communicating with said slot and having a first axis; a cutter disposed in said slot and having a rear surface adjacent said bottom surface and a second bore with a second axis parallel to said first axis, said first axis being disposed between said second axis and said bottom surface and said cutter having a first annular surface surrounding said second bore; and means for coupling said cutter to said holder, including a shank extending into one of said bores and a head having a larger diameter than said shank and extending into the other of said bores and having a second annular surface, at least a portion of at least one of said annular surfaces being at least substantially conical and bearing against the other of said annular surfaces to thereby urge said rear surface against said bottom surface, said cutter having a passage communicating with said second bore and extending to said rear surface to allow for extraction of said cutter from said slot while said coupling means extends into said slot.

* * * * *